United States Patent Office 3,637,909
Patented Jan. 25, 1972

3,637,909
POLYURETHANES PROCESS AND PRODUCT PREPARED FROM ALIPHATIC POLYCARBONATES CONTAINING IN SITU POLYMERIZED UNSATURATED COMPOUNDS
Wulf von Bonin, Erwin Muller, and Kuno Wagner, Leverkusen, Germany, assignors to Farbenfabriken Bayer Aktiengesellschaft, Leverkusen, Germany
No Drawing. Filed July 9, 1969, Ser. No. 840,474
Claims priority, application Germany, July 15, 1968, P 17 69 795.9
Int. Cl. C08f *29/10;* C08g *39/10, 22/08, 41/00*
U.S. Cl. 260—859 R                7 Claims

ABSTRACT OF THE DISCLOSURE

Polyurethanes and a process for preparing them in which polyisocyanates are reacted with aliphatic polycarbonates containing at least two hydroxyl groups and having a molecular weight of 800 to 3000, which polycarbonates have been prepared by polymerizing unsaturated compounds in situ, if desired with formation of grafh polymers.

The hydrolytically stable polyurethanes of this invention are highly advantageous for use in any application in which hydrolytic conditions may be encountered such as, for example, bathtub mats, kitchen aids, gears, molded parts, gaskets, O-rings, shoe heels, shock absorbers and so on.

---

The preparation of polyurethane resins from diisocyanates, chain lengthening agents and polyhydroxyl compounds into which polymerizable unsaturated compounds have been incorporated by polymerization in situ has already been described, e.g. in German Pat. 1,152,537. The products obtained by this process show improved tear resistance; however, the only polyhydroxyl compounds suggested as suitable in this process are polyethers and polyesters.

Another process for preparing cross-linked polyurethanes by reacting hexane-1,6-diol-polycarbonate with diisocyanates and chain lengthening agents is described in French Pat. No. 1,540,799. In addition to having good mechanical properties, these elastic resins have a good resistance to hydrolysis. When they are subjected to 14 days hydrolytic ageing at 70° C. and 95% atmospheric moisture, most such resins show only a small deterioration in their mechanical properties, e.g. their strength.

It is therefore an object of this invention to provide a polyurethane and a process for preparing it which are devoid of the foregoing disadvantages.

Another object of this invention is to provide hydrolytically stable polyurethanes and a process for preparing them.

A further object of this invention is to provide polyurethane polymers having improved tear strength and low temperature strength and a process for preparing them.

Still another object of this invention is to provide polycarbonate polyurethanes which possess a considerably improved low temperature strength and a process for preparing them.

Yet another object of this invention is to provide polyurethanes, the properties of which are not impaired and, indeed, usually improved upon hydrolytic ageing and a process for preparing them.

The foregoing objects and others which will become apparent from the following description are accomplished in accordance with this invention, generally speaking, by providing polyurethanes prepared by reacting polyisocyanates with aliphatic polycarbonates having a molecular weight of from about 800 to about 3000 and at least two hydroxyl groups and characterized by having polymerized in the polycarbonates polymerizable unsaturated compounds. A chain lengthening agent and/or cross linking agents may also be incorporated in the reaction mixture and, if desired, the polymerizable unsaturated compounds may partly be polymerized to form graft polymers with the aliphatic polycarbonate in which they are polymerized. The present invention also relates to a process in which polymerizable unsaturated compounds are polymerized in situ in an aliphatic polycarbonate having a molecular weight of from about 800 to about 3000 and at least two hydroxyl groups and the resulting polycarbonate containing polymerized unsaturated compounds is reacted with an organic polyisocyanate and, if desired, chain lengthening and/or cross-linking agents.

It has now surprisingly been found that polyurethanes which show a considerable improvement in their mechanical properties after 14 days' hydrolytic ageing at 70° C. and 95% atmospheric moisture are obtained if the polyhydroxyl compounds which are reacted with polyisocyanates and, if desired, with chain lengthening agents, are aliphatic polycarbonates containing at least two hydroxyl groups, which polycarbonates are prepared by polymerizing polymerizable unsaturated compounds in situ in the aliphatic polycarbonate. Depending on the nature of the aliphatic polycarbonate polymer, both the tear resistance, for example, and the low temperature strength of the polyurethanes can be improved. Thus, for example, polycarbonates which have been polymerized with acrylonitrile can be used to obtain synthetic resins which have considerably greater strength after 14 days' hydrolytic ageing than before. The polymerization, e.g. of acrylic acid esters with aliphatic polycarbonates, causes a considerable improvement in the low temperature strength of the polyurethanes obtained. The present invention therefore allows the production of polyurethanes which have the required properties which are not impaired and, indeed, in most cases, usually considerably improved by hydrolytic ageing. The products of this invention thus differ from the polyurethane resins previously known, the properties of which are at best partly retained but usually considerably impaired by hydrolytic ageing.

According to the invention, aliphatic polycarbonates which contain at least two hydroxyl groups and have a molecular weight of 800 to 3000, in which polycarbonates polymerizable unsaturated compounds have been polymerized, if desired with the formation of graft polymers, are used as starting materials.

The polycarbonates used for this purpose preferably have an average molecular weight of about 2000 and are obtained by methods known per se including the ester interchange of polyhydroxyl compounds such as butane-1,4-diol, $\Delta^2$-butene-1,4-diol, hexane-1,6-diol, $\Delta^3$-hexane-1,6-diol, neopentyl glycol, octane-1,8-diol, $\Delta^4$-octene-1,8-diol and the like with aryl carbonates such as, for example, diphenyl carbonate. Hexane-1,6-diol polycarbonate, for example, is found to be particularly suitable and yields products which have superior properties when it has been polymerized with acrylonitrile or with butyl acrylate. Notwithstanding, any other aliphatic polycarbonates may be used in the practice of the invention including polycarbonates obtained from mixtures of hexane-1,6-diol and b-hydroxyethyl hexane diol and polycarbonates obtained from caprolactone and hexane-1,6-diol as well as those described in U.S. Pats. 3,248,414; 3,227,740; Canadian Pat. 791,813 and the like and mixtures thereof.

Mixtures of polycarbonates with polyesters and polyethers such as those disclosed in U.S. Pat. 3,201,372 may also be used. If desired, hydroxyl-containing polyesters, e.g. polyesters which are obtained from aliphatic dicarboxylic acids and glycols, and hydroxyl-containing polyethers, e.g. polyethers obtained from alkylene oxides such as ethylene oxide or propylene oxide, may be used together with the aliphatic polycarbonates. Mixtures of hexane-1,6-diol-polycarbonate with polyesters of the type which have been obtained from glycols and aliphatic dicarboxylic acids are preferred.

The modified polycarbonates of this invention are usually prepared by dissolving polymerizable, unsaturated compounds in the aliphatic polycarbonate and initiating polymerization with the addition of radical-forming initiators. Alternatively, the monomers and the activator may be slowly added to the aliphatic polycarbonate under polymerization conditions or the activator may first be heated to the reaction temperature with the aliphatic polycarbonate and the monomer or mixture of monomers added subsequently. The polymerization process may be varied as required to adapt it to specific technical requirements in the usual manner. This also applies to the reaction temperatures which are used and which generally range between about 5° and about 180° C. The polymers which have been prepared in situ are suspended in the polycarbonates, in some cases as homopolymers. They may also, depending on the choice of monomers or aliphatic polycarbonates, be partly or completely dissolved in the polycarbonate or may be present partly or completely as graft polymers. Graft polymers are preferably formed if unsaturated aliphatic polycarbonates are used. The polymerization of the unsaturated monomer takes place in the melt of the polycarbonate without any solvent being present.

The polymerizable, unsaturated compounds may be compounds having one or more radical-forming, polymerizable double bonds such as, for example those vinyl monomers disclosed in U.S. Pat. 3,225,119. Acrylonitrile and methyl-, ethyl- and butylacrylate are particularly suitable. Aromatic vinyl compounds such as styrene or styrenes which are substituted in the nucleus or side chain, such as a-methyl styrene, or olefinic hydrocarbons such as ethylene, or vinyl esters such as vinyl acetate or vinyl chloride and vinylidene chloride are also suitable as are polyvinyl compounds such as divinyl benzene, triallylcyanurate or glycoldimethyl acrylate. Unsaturated compounds which contain reactive groups which will react with isocyanates or other compounds, e.g. hydroxyethyl or hydroxypropyl (meth)acrylate, acrylamide, methacrylamide-N-methylol allyl ether, methacrylamide-N-methylol-methyl ether, glycidyl(meth)acrylate or allyl acrylate are also suitable. A mixture of the unsaturated compounds may also be used.

Usually from about 0.5% to about 60% by weight, preferably 1 to 30% by weight of polymerizable unsaturated compound based on the weight of the polycarbonate is dissolved in the aliphatic polycarbonate and polymerization of the polymerizable compound with stirring is initiated after the addition of a polymerization initiator if desired with the exclusion of atmospheric oxygen. In another embodiment of the process, the polymerization initiator is dissolved in the unsaturated compound at room temperature and the solution thus obtained is introduced dropwise at elevated temperature, i.e. the reaction temperature, into the aliphatic polycarbonate with rapid stirring. Monomers still present after polymerization may be removed in vacuo at temperatures of up to about 130° C.

Suitable polymerization initiators for this purpose are the customary radical forming agents such as, for example, peresters, percarbonates, hydroperoxides or peroxides, e.g. of the lauroyl peroxide, benzoyl peroxide or dicumoyl peroxide type, or nitrogen-containing radical-forming compounds such as azodiisobutyronitrile. Redox systems such as benzoyl peroxide/dimethyl toluidine may also be used. Additional initiation using high energy radiation may also be employed. The radical-forming agents are generally used in quantities of 0.01 to 15% by weight, preferably 0.1 to 5% by weight, based on the weight of the polymerizable unsaturated compound.

Polyisocyanates which are particularly suitable for use in the process of the invention are, for example, 1,4-butylene diisocyanate, 1,6-hexamethylene diisocyanate, 2,4- and 2,6-toluylene diisocyanates and any mixture of these isomers and p-xylylene diisocyanate, 4,4'-dimethyl-1,3-xylylene diisocyanate, cyclohexylene-4,4'-diisocyanate, m- and p-phenylene diisocyanates, 1-alkylphenylene-2,4- and 2,6-diisocyanates, 3-(a-isocyanatoethyl)phenylisocyanate, 2,6-diethylphenylene-1,4-diisocyanate, diphenylmethane - 4,4' - diisocyanate, diphenyl-dimethylmethane-4,4'-diisocyanate, diphenylether - 4,4' - diisocyanate, naphthylene-1,5-diisocyanate and mixtures thereof and the like. Other isocyanates such as those disclosed in Canadian Patent 698,636 and including tri- or polyfunctional isocyanates may also be included, e.g. 2,4,6-triisocyanatotoluene.

Chain lengthening and/or cross-linking agents which may be included, if desired, in the instant process are already known, and generally have a molecular weight of up to about 500 including, for example, glycols such as butane-1,4-diol, diamines such as 3,3'-dichloro-4,4'-diaminodiphenylmethane and the like as well as any of those disclosed in U.S. Pat. 3,201,372 and mixtures thereof. Water may also be used as chain lengthening or cross-linking agent.

The modified polycarbonates used in the instant process can be converted into high quality synthetic resins by known processes using polyisocyanates and chain lengthening or cross-linking agents. For example, the polycarbonates may be reacted with an excess of diisocyanate after which low molecular weight compounds such as glycols, diamines or water may be added in quantities which insure that NCO groups will still be present after the reaction. The free NCO groups are then available for cross-linking.

In this manner, molded products which solidify and assume their final characteristics after heating can be produced. If prolonged curing after the casting operation is omitted, products are obtained which can be thermoplastically shaped subsequently if stored with the exclusion of moisture. Products which have different degrees of hardness and highly elastic properties can be obtained in this way.

If the proportions of polycarbonate, low molecular weight chain lengthening agent and diisocyanate are chosen so that free hydroxyl groups remain after the reaction, storable thermoplastic products which can be worked up on rollers are obtained. These can be converted into the cross-linked, elastic state, for example, by adding more diisocyanate, e.g. dimeric 2,4-tolylene diisocyanate.

The storage stable hydroxyl-containing products can be cross-linked with diisocyanates and also, for example, with sulphur, peroxides or formaldehyde. In such a case, it is desirable that the hydroxyl containing chains should contain constituents which can react to cross-link with these compounds. Such constituents are advantageously built into the chain by using a low molecular weight, bifunctional hydroxyl compound.

Thus, for example, products which can be cross-linked with sulphur are obtained by reacting the polycarbonates with glycerol monoallyl ether and diisocyanates. Products which can be cross-linked with formaldehyde are obtained if m-dihydroxyethyl toluidine or N,N'-bis-methyl-bis-b-hydroxyethyl-4,4'-diaminodiphenylmethane is used instead of glycerol monoallyl ether. If the diisocyanate used is 4,4'-diphenylmethane diisocyanate, products which can be cross-linked with peroxides are obtained.

The hydrolytically stable polyurethanes of this invention are highly advantageous for use in any application in which hydrolytic conditions may be encountered. Hence, the polymers of this invention are particularly suitable for the preparation of molded objects which are subjected to the rigors of the weather and any of those domestic and commercial applications in which they will be subjected to moisture. For example, the polymers of this invention are eminently suitable for the production of bathtub mats and kitchen aids heretofore prepared from rubber. They may also be used for making gears and molded parts, gaskets, O-rings, shoe heels, shock absorbers and the like.

The invention is further illustrated but is not intended to be limited by the following examples in which all parts and percentages are by weight unless otherwise specified.

EXAMPLE 1

A polyhydroxyl compound is prepared by dissolving about 5 parts of acrylonitrile and about 0.1 part of azodiisobutyronitrile in about 100 parts of hexane diol polycarbonate followed by polymerization under nitrogen at about 80° C., removal of the residual monomers in vacuo and the removal of water at about 130° C./12 mm. Hg. About 85 parts of 4,4'-diisocyanato-diphenyl methane are stirred into about 200 parts of this polyhydroxyl compound (3.35% acrylonitrile; OH number 67). The temperature of the polyhydroxyl compound and the diisocyanate rises to about 137° C. About 18 parts of butane-1,4-diol are then stirred into the melt after about 15 minutes, and the homogeneous mass is poured into molds. After about 24 hours' curing at about 100° C., a material having the following properties is obtained:

| | | After 14 days' hydrolytic ageing at 70° C./95% atmospheric moisture |
|---|---|---|
| Tensile strength, kg./cm.$^2$ | 239 | 255 |
| Elongation at break, percent | 310 | 297 |
| Permanent elongation, percent | 30 | 21 |
| Tear resistance, kg./cm | 55 | 44 |
| Shore hardness A | 91 | 91 |
| Impact elasticity | 34 | 34 |

EXAMPLE 2

About 200 parts of a polyhydroxyl compound (OH number 60) prepared in a manner similar to that given in Example 1 from hexane-1,6-diol polycarbonate, 10.5% acrylonitrile and 0.5% of methacrylamide, are reacted with about 81.5 parts of 4,4'-diisocyanatodiphenyl methane and about 18 parts of butane-1,4-diol under the experimental conditions given in Example 1. The material obtained has the following properties:

| | | After 14 days' hydrolytic ageing at 70° C./95% atmospheric moisture |
|---|---|---|
| Tensile strength, kg./cm.$^2$ | 255 | 293 |
| Elongation at break, percent | 267 | 305 |
| Permanent elongation, percent | 44 | 42 |
| Tear resistance, kg./cm | 46 | 44 |
| Shore hardness A | 94 | 95 |
| Impact elasticity | 33 | 35 |

EXAMPLE 3

A polyhydroxyl compound (OH number 44.8) is prepared from hexane-1,6-diol polycarbonate and about 30% of butyl acrylate by adding about 30 parts of a solution of about 2 parts of azodiisobutyronitrile in about 98 parts of butyl acrylate dropwise, over about 1.5 hours, to about 70 parts of hexane diol polycarbonate (molecular weight 2000) which has been heated to about 120° C. The reaction mixture is then heated under the conditions given in Example 1. About 200 parts of this polyhydroxyl compound and about 80 parts of 4,4'-diisocyanatodiphenylmethane are reacted with about 20 parts of butane-1,4-diol as given in Example 1. The material obtained has the following properties:

| | | After 14 days' hydrolytic ageing at 70° C./95% atmospheric moisture |
|---|---|---|
| Tensile strength, kg./cm.$^2$ | 212 | 223 |
| Elongation at break, percent | 292 | 328 |
| Permanent elongation, percent | 30 | 25 |
| Tear resistance, kg./cm | 50 | 45 |
| Shore hardness A | 93 | 93 |
| Impact elasticity | 34 | 34 |

It is to be understood that any of the components and conditions mentioned as suitable herein can be substituted for its counterpart in the foregoing examples and that although the invention has been described in considerable detail in the foregoing, such detail is solely for the purpose of illustration.

What is claimed is:

1. A process for preparing polyurethanes from aliphatic polycarbonates which comprises polymerizing polymerizable unsaturated compounds in situ in an aliphatic polycarbonate having a molecular weight of from about 800 to about 3000 and containing at least two hydroxyl groups in which from about 0.5% to about 60% by weight of the polymerizable unsaturated compound based on the weight of the polycarbonate is polymerized, and reacting the resulting polycarbonate containing polymerized unsaturated compounds with an organic polyisocyanate.

2. The process of claim 1 wherein the aliphtaic polycarbonate is a hexane-1,6-diol polycarbonate having an average molecular weight of about 2000.

3. The process of claim 1 wherein the hexane-1,6-diol polycarbonate is admixed with a polyester prepared by reacting a glycol with an aliphatic dicarboxylic acid.

4. The process of claim 1 wherein a chain lengthening or cross-linking agent having a molecular weight of up to about 500 is also reacted with the polyisocyanate.

5. The process of claim 1 wherein the polisocyanate is 4,4'-diisocyanatodiphenylmethane.

6. The process of claim 1 wherein the unsaturated compound is acrylonitrile, methacrylamide or butyl acrylate.

7. The product of the process of claim 1.

References Cited

UNITED STATES PATENTS

| 3,304,273 | 2/1967 | Stamberger | 260—873 |
| 3,379,693 | 4/1968 | Hostettler et al. | 260—873 |
| 2,806,836 | 9/1957 | Nischk et al. | 260—859 R |
| 3,422,165 | 1/1969 | Brotherton et al. | 260—859 R |

FOREIGN PATENTS

| 631,690 | 11/1961 | Canada | 260—859 R |

WILLIAM H. SHORT, Primary Examiner

E. WOODBERRY, Assistant Examiner

U.S. Cl. X.R.

260—77.5 AN, 77.5 AP, 873